United States Patent [11] 3,593,252

| [72] | Inventors | Morris A. Shriro<br>Mount Vernon;<br>Myron A. Coler, Scarsdale, both of, N.Y. |
|---|---|---|
| [21] | Appl. No. | 830,833 |
| [22] | Filed | June 5, 1969 |
| [45] | Patented | July 13, 1971 |
| [73] | Assignee | Markite Corporation<br>New York, N.Y.<br>Continuation-in-part of application Ser. No. 740,259, June 26, 1968. |

[54] POTENTIOMETER STRUCTURE
6 Claims, 9 Drawing Figs.

[52] U.S. Cl. .................................................. 338/132,
338/175, 338/184, 338/195, 338/308
[51] Int. Cl. .................................................. H01c 5/02,
H01c 9/02
[50] Field of Search .......................................... 338/128-
—135, 142, 162, 164, 165, 169, 170, 175, 183,
184, 195, 308

[56] References Cited
UNITED STATES PATENTS

| 2,859,319 | 11/1958 | Karg ............................ | 338/132 |
| 3,100,883 | 8/1963 | Blanco ......................... | 338/131 X |
| 3,448,427 | 6/1969 | Baskett ......................... | 338/162 |

FOREIGN PATENTS

| 1,203,174 | 7/1959 | France .......................... | 338/162 |
| 1,522,535 | 3/1968 | France .......................... | 338/162 |

Primary Examiner—Lewis H. Myers
Assistant Examiner—Arthur T. Grimley
Attorney—Leonard H. King ABSTRACT: In a device such as a potentiometer or the like, means are provided for mounting and retaining the element so as to permit the elimination of coupling means such as conventional housings, tie rods, clamp rings, fasteners, or the like. The actuating shaft of the device is placed in tension thus permitting the use of a longer and more accurate track that also has greater power dissipation. Because of the absence of conventional coupling means, adjustment and compensation for errors may be made after assembly.

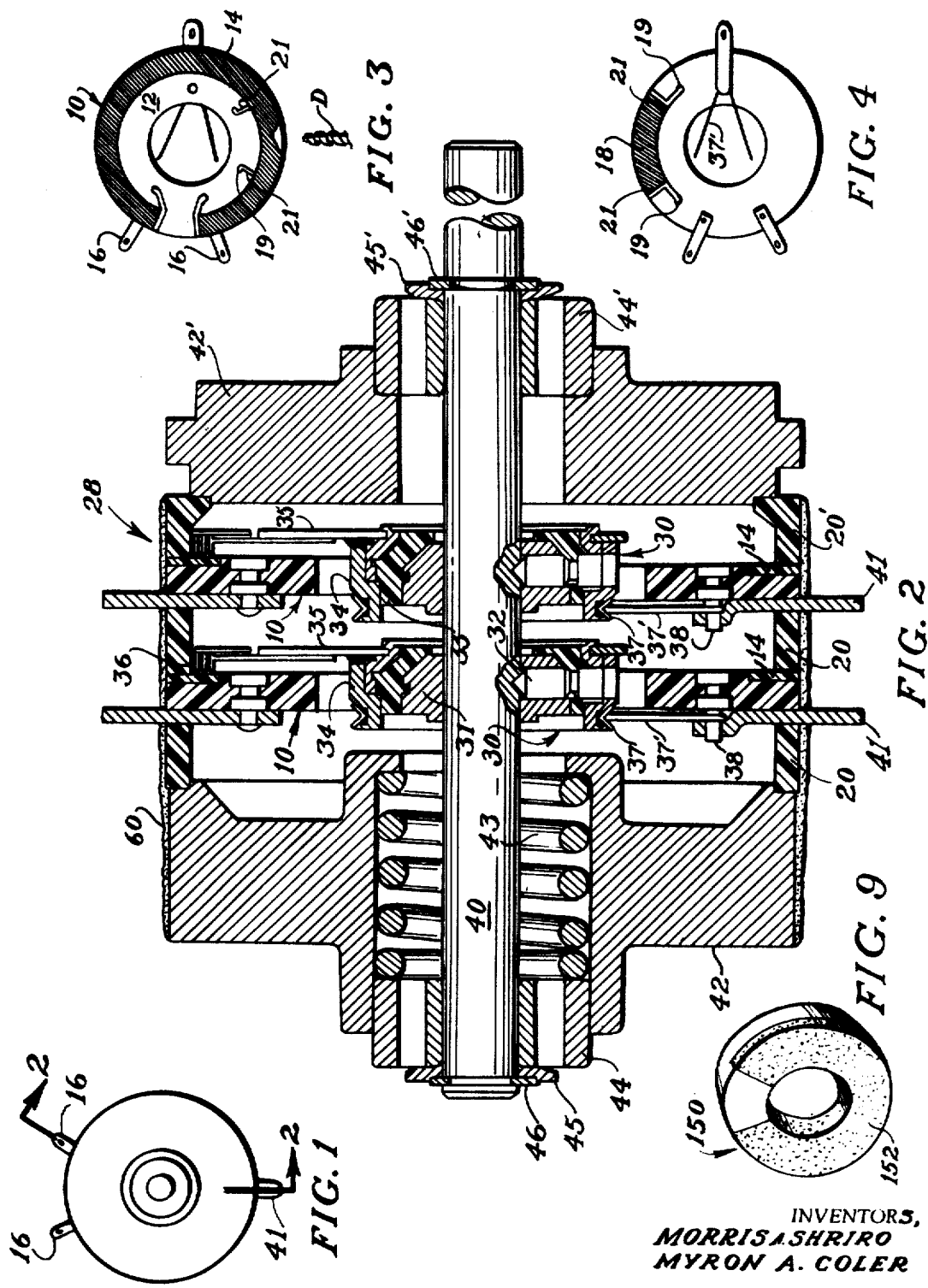

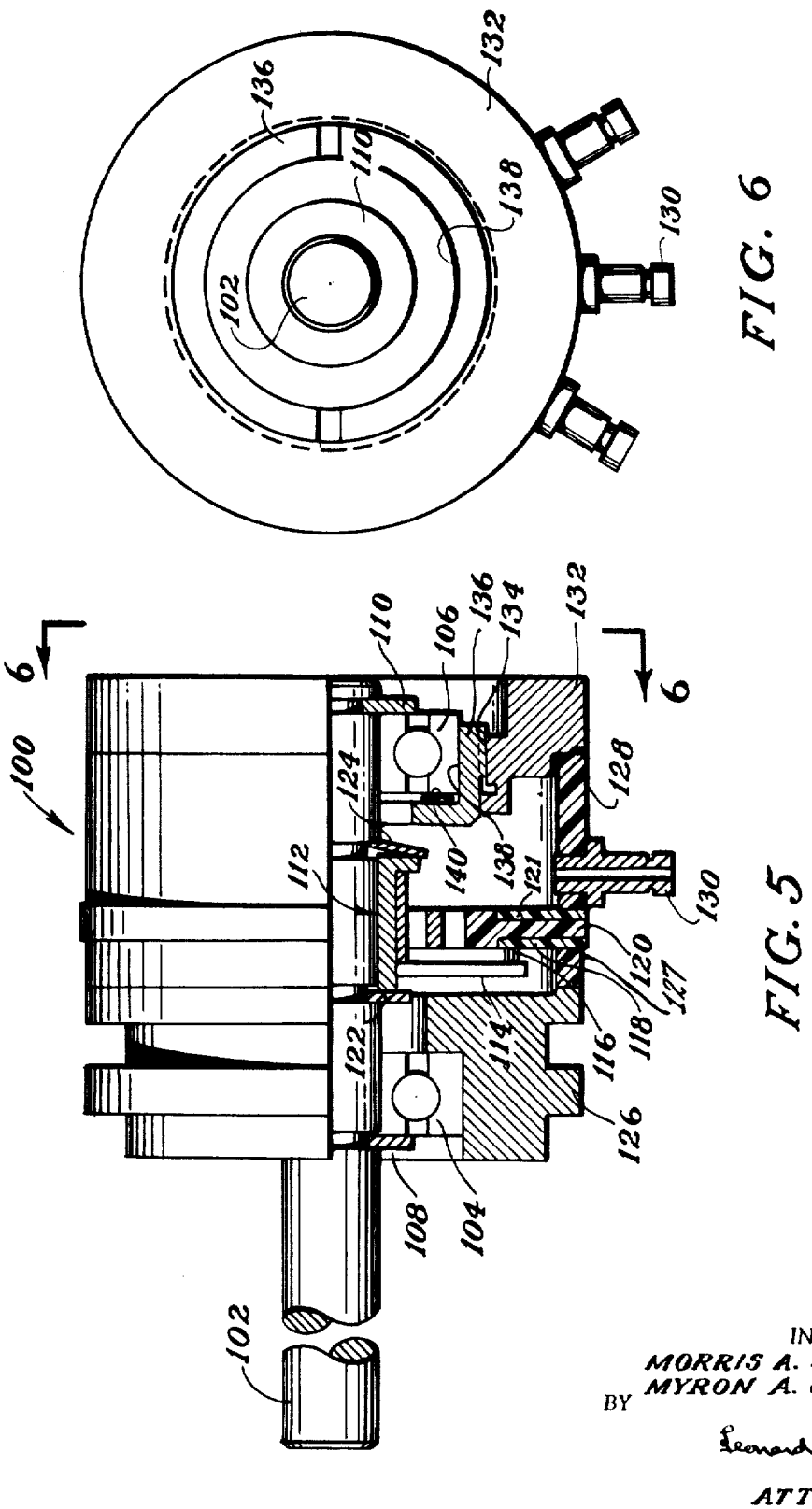

PATENTED JUL 13 1971 3,593,252

INVENTOR.
MORRIS A. SHRIRO
MYRON A. COLER

POTENTIOMETER STRUCTURE

This invention is a continuation-in-part of our copending application, Ser. No. 740,259, filed on June 26, 1968.

This invention relates generally to precision electromechanical devices and, in particular, to novel element mounting and retaining means in potentiometers or the like.

BACKGROUND OF THE INVENTION

Many electromechanical devices such as computers, navigational aids, radar sets, and other like devices, require the translation of the position of either a rotating or linearly movable shaft into a plurality of electrical signals. Conventionally, this is accomplished through the use of at least one and often a multiplicity of individual potentiometer cups coupled together and varied simultaneously by a common control shaft. The term "cup" is employed with reference to a modular potentiometer section which includes a resistance element, takeoff means, wiper means and terminal means.

Prior art devices such as potentiometers or the like generally require the use of housings and, where several potentiometers were ganged together, coupling means such as tie rods, clamp rings, radially directed fasteners and the like were also needed. The coupling means of the prior art devices, in addition to involving extra material and labor costs, also tended to limit the size and location of the resistance track. It should also be noted that because the prior art devices required coupling means as described above, compensation for errors in output was rendered more difficult. Typical of the errors referred to are concentricity in rotary devices and maintenance of a predetermined relationship between the wiper means and resistance track in linear devices. Heretofore compensation for errors and the achievement of a greater output accuracy was obtained, for example, by means of tap arrangements but this was necessarily done on a point-to-point basis and, in many applications, was not sufficiently accurate.

By way of contrast the present invention provides improved structure for a potentiometer, either rotary or linear, that includes an insulator substrate on which is formed a conductive plastic resistance track. Frequently a conductive plastic pad or trimming resistor is also included. In the rotary device, the shaft supports bearing means on which are mounted axially spaced end members. The substrate or substrates in a ganged device are captured between opposed transverse faces of the end members. No housing or coupling means other than those illustrated are required. Thus where the conductive plastic means extends to the periphery of the substrate it is readily accessible and may be altered so as to correct output errors. Because the output can be accurately adjusted, concentricity problems are less critical in rotary devices. In linear devices any deviation in the relationship between the wiper and the optimum wiper path along the resistance track can be compensated for since a portion of the resistance element remains exposed even after assembly. In either the rotary or the linear device, material may be either added to or removed from the resistance element.

It should be clearly understood that while the present invention permits and in fact facilitates postassembly adjustment of the output of the device, the invention is not limited thereto. The absence of any housing or any conventional coupling means provides its own distinct advantage in that the resistance track may be located on the I.D. of the annular substrate, or may extend between the I.D. and the O.D. of the annular substrate.

Accordingly it is an object of this invention to provide improved shaft-mounting means that are applicable to both single and ganged potentiometer assemblies.

A particular object of this invention is to provide means for tensioning the shaft of a potentiometer.

It is also an object of this invention to provide an improved multielement, precision potentiometer.

It is a different object to provide either a multielement or a single precision potentiometer having means that facilitate trimming the element after assembly of the potentiometer.

Still a further object of this invention is to provide improved means for phasing the cups of a multielement potentiometer.

A different object of this invention is to provide an improved single- or multielement potentiometer employing conductive plastic elements.

An important object of this invention is that either a single- or multielement precision potentiometer is characterized by the absence of conventional housing and coupling means.

An important feature of this invention is that the absence of any conventional housing or coupling means permits the postassembly compensation for output errors.

An advantage of this invention is that concentricity errors or deviations from an optimum wiper path are less critical than with prior art devices because of the accessibility of a portion of the resistance element for postassembly correction of output errors.

Another object of the invention is to provide a method of making single- and multielement precision potentiometers.

These and other objects, features and advantages of the invention will, in part, be pointed out with particularity and will, in part, become obvious from the following more detailed description of the invention taken in conjunction with the accompanying drawing which form an integral part thereof.

BRIEF DESCRIPTION OF THE DRAWING

FIG. 1 is an end view of one embodiment of multielement potentiometer of this invention;

FIG. 2 is a longitudinal, sectional view taken along line 2-2 of FIG. 1;

FIG. 3 is a plan view of a typical element used in either a single or ganged potentiometer;

FIG. 4 is a plan view of the reverse side of the element of FIG. 4;

FIG. 5 is a longitudinal, sectional view, similar in orientation to FIG. 2, illustrating an alternative single-element embodiment of the invention;

FIG. 6 is an end view taken along line 6-6 of FIG. 5;

FIG. 9 is a perspective view schematically illustrating the location of a resistance element in a rotary device.

Figure 7:
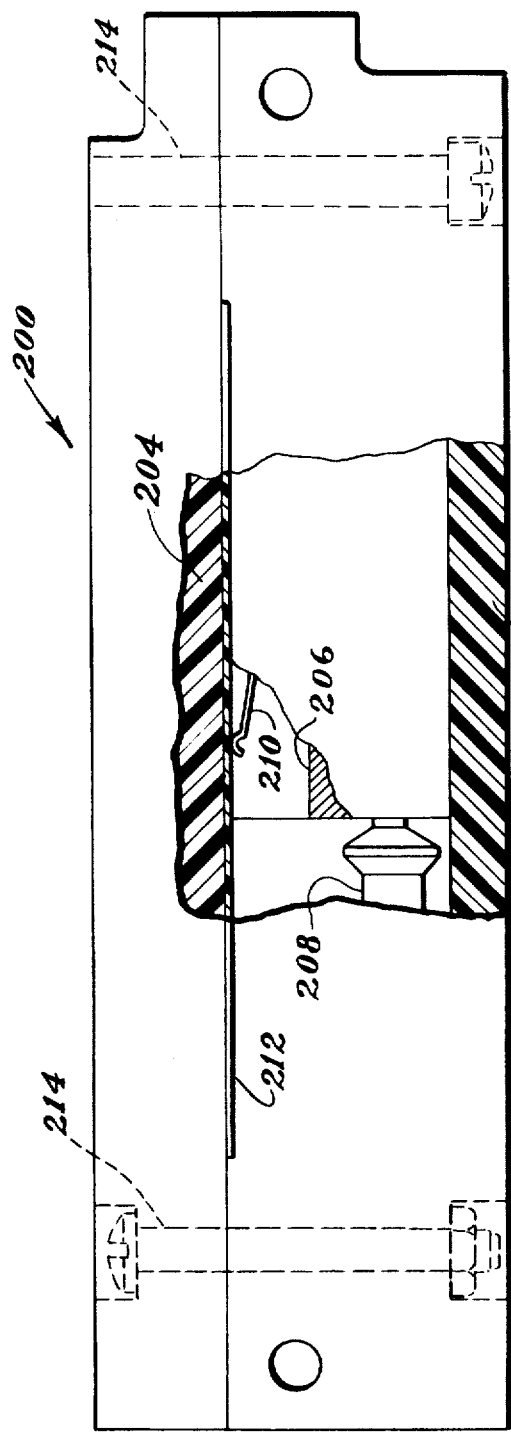
FIG. 7 is a longitudinal, elevational view, partly in section, illustrating the application of one aspect of this invention to a device such as a linear potentiometer.

Turning first to FIG. 9 there is shown an annular substrate 150 on one transverse surface of which is formed a conductive plastic resistance element 152 The purpose of this figure is to illustrate that the resistance element 152 may extend from the I.D. to the O.D. of the substrate or may occupy any portion thereof as required by the design characteristics of the device. Further the resistance element may also cover the axial of the device thus permitting the wipe means to traverse that surface if such is a requirement of the design. Where the resistance element extends outwardly to the O.D. of the substrate, the compensation for errors may be accomplished after assembly by either adding or removing material therefrom. Regardless of the method of adjusting for output errors the annular substrate 150 may, as will be described more fully hereinafter, be supported without the use of conventional housings or other coupling means than have been used in the prior art.

Referring now to FIG. 3, there is shown a typical element 10 comprising an insulator substrate 12 having formed thereon a conductive plastic resistance track 14 and a pair of fixed terminals 16. It will be noted that the resistance track 14 extends radially inward from the periphery of the element. As will be explained hereinafter this construction, which is contrary to normal practice, is made possible by the novel shaft arrangement of the present invention. However, the present invention is not to be limited to this track location. The advantage of the novel tensioned shaft applies to I.D. as well as other surface locations of the resistance element. The other side of the insulator substrate 12 may have one or more padding resistors 18, again extending radially inward of the periphery if so desired.

Interconnection between resistance track 14 and padding resistor 18 is made by means of a feedthrough terminal 19 to which conductive strips 21 join the resistance track 14 and padding resistor 18.

To define a ganged potentiometer assembly 28 in accordance with the teaching of one embodiment of this invention, a plurality of elements 10 are assembled in stacked relationship, as shown in FIG. 2, with insulator rings 20 arranged between adjacent elements 10.

A brush block assembly 30 includes a hub member 31, a locking setscrew 32, an insulator sleeve 33 and a metal collar 34. A brush arm 35 carries a brush 36. The brush arm is connected to the collar 34 as is a slip ring 37. A hairpin wiper 37' contacts the slip ring 37. Thus, electrical connection is made from the resistance track 14 to the hairpin wiper 37', a metal post 38 and to a terminal 41.

The potentiometer 28 is assembled by mounting one or more brush block assemblies 30 on a shaft 40, positioning an element 10 coaxially about the shaft 40, adding a spacer 20 and then repeating the operation until the desired number of elements 10 are assembled.

Thereafter an end member 42, a spring 43, a bearing 44, a washer 45 and a snap ring 46 are positioned on the shaft 40. At the other end of the potentiometer 28, a spacer 20', an end bell 42' and a bearing 44' are added and retained in place by means of a washer 45' and a snap ring 46'. The end bell 42' may be a servo mount type as shown.

It will be appreciated that at this point there is no housing structure as is found in a conventional potentiometer and that the entire assembly is held in compression through the action of a spring 43 acting against the thrust bearing 44, which in-turn, transfers the load to the shaft through the washer 45 and the snap ring 46. Actually, the spring 43 resiliently takes up axial end play. Upon completion of the assembly, the operator rotates each element back and forth, until it is determined that the element 10 has the proper phase relationship to the brush 36. After phasing operations are completed, the entire assembly may be coated with an epoxy cement 60. A small brush is suitable as an applicator for this purpose.

Thereafter the shaft 40 is rotated and an input voltage is applied between the fixed terminals 16 of the resistance element 14 and the output taken between one of the terminals 16 and the wiper terminal 41 and is compared for various angular positions of the shaft 40 with that of a standard potentiometer. If the voltage reading is outside a predetermined tolerance, then a suitable tool, for example, a drill or cutter D (FIG. 3), is used to remove, for example by abrading, a portion of the respective padding resistor 18 or portions of the conductive plastic track 14 until the desired performance curve is obtained. It is also possible to effect a degree of calibration by adding a conductive material along the exposed edge of the resistance track 14 in a selective manner. It should be noted that the presence of the conductive plastic track 14 on the outer periphery of the element 10 renders this approach practical. While the method of calibrating has been described as abrading, the invention is not so limited. Material may be removed or added by any conventional method.

After trimming, the holes made by drill D may be filled with a sealant such as epoxy resin, silicone rubber or other equivalent products.

For particularly low-torque applications, the spring 43 may be moved after assembly and adjustment has been completed. This may be done by removing the bearing 44 and the spring 43 and replacing the spring 43 with a suitably sized bushing. If it is intended that the spring 43 be replaced, the respective positions of the bearing 44 and bushing may be interchanged from that shown in FIG. 2. It will also be appreciated that the spring 43 can be temporarily mounted externally for assembly purposes permitting the end member 42 to be similar to the end bell 42'. This could be done by clamping the spring 43 between the end face of the member 42 and by providing an enlarged washer which would ultimately be replaced by the washer 45. In applications where final trimming of the element 10 is not required, the resistance track 14 need not extend to the outer edge.

Whereas the foregoing particularly describes the structure of a ganged potentiometer, the next embodiment shown in FIGS. 5 and 6 will be used to describe the basic concept of this invention in connection with a single-element potentiometer 100. Means functionally equivalent to the spring 43 will also be described.

As shown particularly in FIG. 5, the potentiometer 100 is comprised of a rotatable shaft 102 on which bearings 104 and 106 are mounted in axially spaced relationship. Retaining rings 108 and 110, positioned about the shaft 102 in suitably dimensioned grooves, serve, in part, to limit axial movement of the bearings 104 and 106. A brush assembly 112 comprising a wiper arm 114 and a brush 116 are secured to the shaft 102 for rotation therewith intermediate the bearings 104 and 106. As in the previous embodiment, the brush 116 traverses a resistance track 118 that is formed integrally on a substrate 120 in a conventional manner. A padding resistor 121 may also be formed on the substrate 120 as it was in the first embodiment described. A further detailed discussion of the brush block assembly 112 and the element comprised of the resistance track 118 and substrate 120 need not be given at this time since these components are substantially the same as the element 10 in the previous embodiment. Retaining rings 122 and 124, positioned in suitable sized and located grooves on the shaft 102, prevent axial movement of the brush assembly 112.

The substrate 120 is held the desired axial and angular position by means of an end member 126 that is mounted on the bearing 104 and a sleeve 128. The right-hand transverse surface of the member 126 bears against the left-hand transverse surface of the substrate 120 while the left-hand transverse surface of the sleeve 128 bears against the right-hand transverse surface of the substrate 120. It should be noted at this time that conventional terminal means 130 may also be mounted in the sleeve 128 and connected in any suitable manner to the resistance track 118.

The right-hand transverse surface of the sleeve 128 is in abutment of a second end member 132 that is provided with an internal screw thread 134 that is adapted to mate with a spanner type screw 136. An internal bore 138 is suitably dimensioned so as to receive the outer face of the bearing 106. A preloaded spring 140 is fitted between the transverse outer end face of the screw 136 and the transverse inner end face of the bearing 106. After assembly a suitable sealant, such as an epoxy resin, may be used to join the confronting transverse surfaces of the end member 126, the substrate 120, the sleeve 128 and the end member 132.

After first embodiment in the second embodiment are initially assembled, the proper phase relationship of the brush 116 is achieved in the same manner as with the first embodiment. The padding resistor 121 may then be trimmed by either adding or removing material. To maintain the components in their correct position, the screw 136 is threaded outwardly. That is, if a right-hand screw is used it would be turned counterclockwise. As will be appreciated from FIG. 5 of the drawing, this screw 136 cannot move to the right for any appreciable length. Rotation of the screw will thereby cause an axial displacement to the left of the end member 132. This axially leftward displacement will thereby result in a compressive force being placed on the substrate 120 which is positioned between the confronting transverse surfaces of the end member 126 and the sleeve 128.

Figure 8:
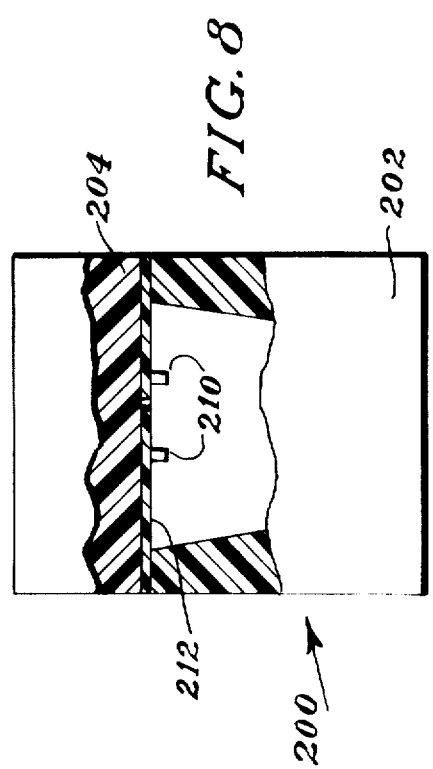
FIG. 8 is a typical transverse, sectional view of the structure shown in FIG. 7 with certain parts omitted for clarity.

Referring now to FIGS. 7 and 8 there is shown a linear potentiometer 200 which includes an elongated insulator housing 202 and an insulator cover member 204. A brush block 206 linearly displaceable in the conventional manner by means of an actuating shaft 208 supports a wiper 210 that is in contact with a longitudinally conductive plastic resistance element 212 formed integrally on the underside of the cover member 204. Screws 214 secure the housing 202 and the cover member 204 to each other. Suitable terminals and other structure conventional in the potentiometer art are not shown and described for purposes of simplicity.

It should be particularly noted that the screws 214 are located beyond the ends of the resistance element 212 which, as shown in FIG. 8, is substantially flush with at least one of the exterior walls of the housing 202 and the cover member 204. In common with the arrangement of the first two embodiments compensation can be made for any output errors even after assembly. Thus it should be understood that in its broadest sense, the present invention provides either in rotary or a linear potentiometer, an exposed portion of the resistance element to permit postassembly adjustment of the output thereof.

In both the first and second embodiments described hereinabove the conventional potentiometer housing is not required. Both the spring 43, shown in the first embodiment, and the screw 136, shown in the second embodiment, act to tension the shaft. Thus, in the rotary device the annular substrate is clamped as if it were in a vise. Because of this arrangement it is possible to expose a portion of the conductive plastic and thereby permit postassembly adjustment of output in the same manner as described in connection with the linear potentiometer.

One advantage of the shaft arrangement described hereinabove in connection with the rotary device is that the resistance track diameter can be substantially greater relative to the O.D. of the substrate thus resulting in proportionately better resolution. The shaft arrangement of this invention provides this advantage in both individual and ganged potentiometer assemblies. It should also be noted at this time that while the advantages of the shaft arrangement of this invention provides this advantage in both individual and ganged potentiometer assemblies. It should also be noted at this time that while the advantages of the shaft arrangement of this invention are more readily apparent when the resistance track is at or near the periphery of the substrate, it is also feasible to locate the resistance track and therefore the wiper on the I.D. of the substrate. The construction described above does not require the use of the conventional housing nor does it require the use of the conventional external clamping rings where the potentiometer assembly is of the ganged type.

A particular advantage of the present invention is that the structure facilitates postassembly adjustment to compensate for output errors. This feature is available in both rotary and linear potentiometers when such an arrangement is desired.

There has been disclosed herein the best embodiment of the invention presently contemplated and it is to be understood that various changes and modifications may be made by those skilled in the art without departing from the spirit of the invention.

What we claim as new and desire to secure by Letters Patent is:

1. A variable resistance device characterized by the absence of a housing comprising:
   a. a rotatable shaft;
   b. at least one substrate having an integral resistance track positioned concentrically with the rotational axis of said shaft;
   c. brush means carried by said shaft for selectively and electrically contacting portions of said resistance track;
   d. circuit connection means for independently connecting said brush means and said resistance track to external circuits; and
   e. clamping means for applying an axial force on said substrate whereby said substrate is subsequently prevented from moving relative to said shaft, said clamping means comprising a pair of end members each having an annular transverse end face positioned in opposition to a transverse surface of said substrate and means for moving at least one of said end members in the direction of said other end member to clamp said substrate therebetween.

2. The device in accordance with claim 1 wherein said resistance track is located on a transverse surface of said substrate and extends radially inward from the periphery thereof.

3. The device in accordance with claim 1 wherein said substrate is annular and said resistance track is formed on the I.D. thereof.

4. The device in accordance with claim 1 wherein there are a plurality of said substrates axially spaced along said shaft.

5. The device in accordance with claim 1 wherein said means for moving said one end member comprises a compression spring.

6. The device in accordance with claim 1 wherein said means for moving said one end member comprises a hollow screw threaded into said one end member and means for preventing axial movement of said screw in one direction whereby rotation of said screw in one direction causes axial movement of said one end member in a direction toward said other member.